No. 866,239. PATENTED SEPT. 17, 1907.
E. VAN NOORDEN.
GLAZED STRUCTURE.
APPLICATION FILED MAY 10, 1906.

WITNESSES
M. E. Flaherty.
M. V. Foley.

INVENTOR
Ezekiel Van Noorden
by
Clarke Raymond & Coale
his attorneys

UNITED STATES PATENT OFFICE.

EZEKIEL VAN NOORDEN, OF BOSTON, MASSACHUSETTS, ASSIGNOR TO E. VAN NOORDEN COMPANY, OF BOSTON, MASSACHUSETTS, A CORPORATION OF MASSACHUSETTS.

GLAZED STRUCTURE.

No. 866,239.        Specification of Letters Patent.        Patented Sept. 17, 1907.

Application filed May 10, 1906. Serial No. 316,070.

*To all whom it may concern:*

Be it known that I, EZEKIEL VAN NOORDEN, of Boston, in the county of Suffolk and State of Massachusetts, a citizen of the United States, have invented a new and useful Improvement in Glazed Structures, of which the following is a full, clear, and exact description, reference being had to the accompanying drawings, forming a part of this specification in explaining its nature.

My invention relates to an improved means or structure for supporting panes of glass and for carrying off the water which may accumulate or flow on the inner side of the glass.

The improvement resides essentially in the main glass supporting and trough structure as distinguished from the auxiliary glass supporting and trough structure branching from the main structure.

The essential object of my invention is to provide a main structure having exceptional strength and rigidity of parts, which structure though of superior utility is not an expensive one, and which structure is especially adapted to receive and support practically any kind of auxiliary glass supporting and trough structure branching or extending from it.

My invention can best be seen and understood by reference to the drawings, in which—

Figure 1:
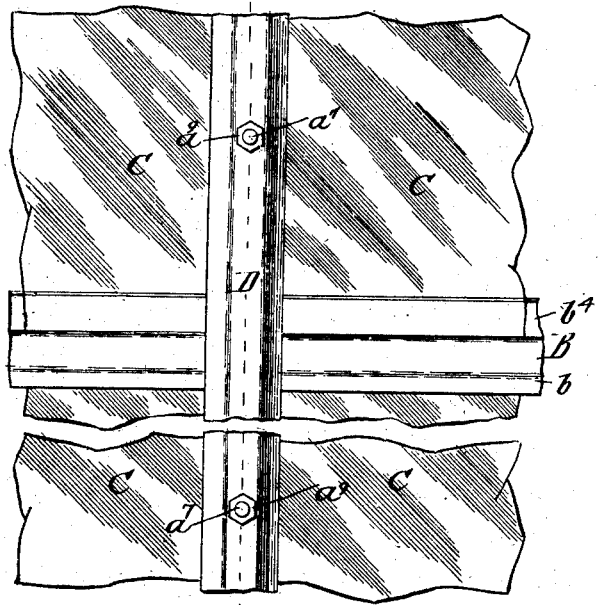
Figure 2:
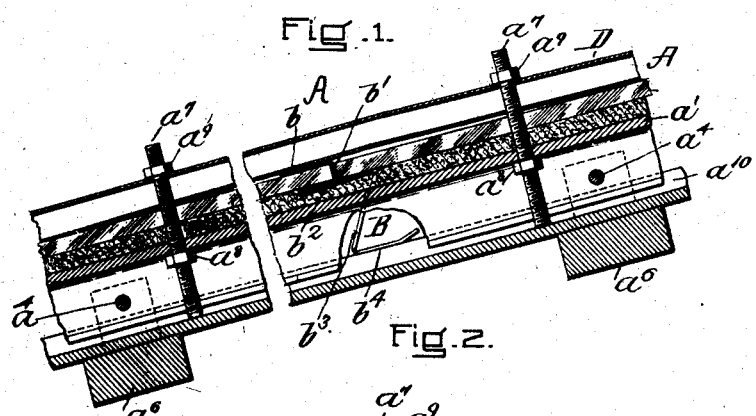
Figure 3:
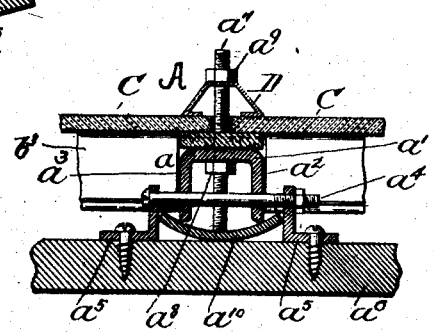

Figure 1 shows the improved glass structure in plan. Fig. 2 shows a longitudinal section thereof, and Fig. 3 shows a cross section thereof.

Referring to the drawings:—A represents that portion of the glazed structure which I will refer to as the main glass-retaining structure and trough combined with it, it being understood, of course, that in practice a series of such are usually employed.

B represents a portion of one of the auxiliary glass supports and troughs which branch from the main structure and which is shown for the purpose of illustrating one especial capability of the main structure as will be hereinafter explained. It will also be understood that the main glass-retaining structures and troughs are usually arranged in a vertically inclined position and the auxiliary supports and troughs extend laterally from them.

Referring first to the main structure A, it comprises the under glass support $a$ consisting of a head $a^1$, on which the edges of the panes of glass C rest, and dependent head supporting sides $a^2$, $a^3$. It is to be noticed that a layer of felt is preferably interposed between the glass and the head upon which it rests. This not only gives a soft cushion for the glass, but it also assists in sealing the joint between the glass and its support. The sides $a^2$, $a^3$ supporting the head $a^1$ on which the glass rests are themselves supported by bolts $a^4$ extending laterally through them. These bolts in turn are retained by angle pieces $a^5$, $a^5$, which are fastened to the purlins of the frame $a^6$, or other fixture. The panes of glass C are held in place by means of the bow-caps D through which extend the bolts $a^7$. These bolts extend between the edges of the panes of glass and through the head $a^1$ on which the panes of glass are resting. Underneath the head, threaded on each of the bolts, is a nut $a^8$ and on the end of each of the bolts $a^7$ above each bow cap is a nut $a^9$. Upon tightening these nuts the panes of glass will be made to hug tight against the support upon which they are resting, thereby holding them securely in place and making tight the joint.

Having thus far referred only to that portion of the main structure comprising the means for supporting the panes of glass, reference will now be made to the trough which also forms a part of the main structure. This trough, as will be seen, is the part $a^{10}$. The trough is made preferably rounding in shape and rests upon the purlins of the frame or other fixture of support beneath the sides $a^2$, $a^3$, supporting the head $a^1$ and between the angle pieces $a^5$, $a^5$ fastened to the purlins as aforesaid. It will be noted that the angle pieces are separated from one another a distance somewhat wider than the main glass support so that the trough, snugly interposed between the angle pieces, is also wider than said support. The trough is made somewhat shallow, the edges thereof curving upward to contact with the bolts $a^4$ so that, resting on the purlins and retained by the angle pieces and bolts, the troughs are held securely in place. As was before explained, the troughs extend along beneath the sides $a^2$, $a^3$ supporting the head $a^1$, and the arrangement is preferably such that these sides will extend down sufficiently to rest upon the troughs, the troughs accordingly giving a support to said sides and head in addition to the support of the bolts $a^4$. This gives an increased rigidity of support. The trough also holds the glass support $a$ against lateral displacement. Further support to the glass supporting head $a^1$ may be given by the bolts $a^7$, the bolts preferably extend down so as to rest upon the bottom of the trough, the nut $a^8$ upon the bolt acting as a collar on the bolt for supporting the head. There is thus obtained a main structure of exceptional strength and rigidity of parts. The structure has also an especial adaptation for receiving and supporting the auxiliary glass supporting structure and troughs B inasmuch as the head $a^1$ which supports the panes of glass acts also as a support for the auxiliary structure. Neither is it necessary to cut recesses in the main troughs for receiving the auxiliary troughs and supports as is customary in many structures, for as was before explained, the main troughs are relatively shallow and the sides or upper edges extend up just high enough so that the auxiliary or cross supports and troughs can rest upon them in addition to their support by the head $a^1$, as before explained. I have illustrated the adaptation of my improved structure in this particular by showing combined with it an old auxiliary glass support and trough made of a single piece of bent metal in which the portion $b$ thereof acts to hold down one of two adjacent panes of glass. The part $b^1$ extends beneath the panes of glass and is bent back to form the part $b^2$ supporting the edges of both panes of glass and the part $b^3$ which extends down to support the trough or gutter $b^4$. Now this auxiliary structure is supported primarily by resting upon the head $a^1$ of the main structure, it being noticed that the strip of metal forming a part of the auxiliary structure (being in fact the glass supporting portion $b^2$) is extended across and rests upon said head. The auxiliary structure, also, extends down just so far that the trough portions thereof will rest upon the top edges of the main trough which hold them securely in place. It may also extend above the main trough if so desired. It is obvious that various other forms of auxiliary glass supporting structure and troughs may be employed in the same way.

Having thus fully described my invention, I claim and desire to secure by Letters Patent of the United States:—

1. In a glazed structure, the combination of a glass support, means for holding the glass thereon, cross bolts for holding said glass support in proper position, means connecting with the purlins of the frame or other fixture of support for retaining said bolts, and a shallow trough independent of said bolt-retaining means, which trough is wider than said glass support and extends along beneath the same and its supporting bolts.

2. In a glazed structure, the combination of a glass support, means for holding the glass thereon, said glass support comprising a glass supporting head and sides dependent therefrom supporting said head, bolts extending crosswise through said sides, means connecting with the purlins of the frame or other fixture of support for retaining said bolts, and a trough independent of said bolt-retaining means, which trough is wider than said glass support and extends along beneath the same and its supporting bolts, and which sides of the glass support are adapted to rest upon said trough.

3. In a glazed structure, the combination of a glass support comprising a supporting head on which the panes of glass rest and sides supporting said head dependent therefrom, a cap-retaining bolt connecting with the head of said glass support and extending therefrom between the edges of the panes of glass, a bow-cap and draw-nut to combine therewith for holding the panes of glass upon said glass support, bolts extending crosswise through the sides of said glass support for supporting the same, independent members connecting with the purlins of the frame or other fixture of support for retaining said bolts, and a shallow curved trough wider than said glass support extending along beneath the same between said bolt-retaining members and beneath said bolts, which sides of the glass support are adapted to rest upon said trough whereby said trough may hold said glass support against lateral displacement.

4. A glazed structure having a main glass support, means for holding the glass thereon, cross bolts holding said glass support in proper position, members connecting with the purlins of the frame or other fixture of support for retaining said bolts, a shallow trough independent of said bolt-retaining members, which trough is wider than said glass support and extends along beneath the same between said bolt supporting members and beneath said supporting bolts, an auxiliary glass supporting structure extending from said main glass support and resting in part thereon, to be supported thereby, the trough of which auxiliary structure rests upon or extends above the upper edge of said main trough.

EZEKIEL VAN NOORDEN.

Witnesses:
JOHN E. R. HAYES,
MARTIN V. FOLEY.